US008030253B2

(12) United States Patent
Roddy et al.

(10) Patent No.: US 8,030,253 B2
(45) Date of Patent: Oct. 4, 2011

(54) FOAMED CEMENT COMPOSITIONS COMPRISING OIL-SWELLABLE PARTICLES

(75) Inventors: Craig W. Roddy, Duncan, OK (US); Jiten Chatterji, Duncan, OK (US); Bobby J. King, Duncan, OK (US); D. Chad Brenneis, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 268 days.

(21) Appl. No.: 12/544,915

(22) Filed: Aug. 20, 2009

(65) Prior Publication Data

US 2009/0312445 A1 Dec. 17, 2009

Related U.S. Application Data

(60) Division of application No. 12/263,800, filed on Jan. 3, 2008, now Pat. No. 7,607,484, which is a continuation-in-part of application No. 12/283,398, filed on Sep. 11, 2008, now Pat. No. 7,607,482, which is a continuation-in-part of application No. 11/223,669, filed on Sep. 9, 2005, now Pat. No. 7,445,669, said application No. 12/263,800 is a continuation-in-part of application No. 12/152,327, filed on May 14, 2008, now Pat. No. 7,617,870.

(51) Int. Cl.
*C09K 8/473* (2006.01)
*C09K 8/467* (2006.01)
*C09K 8/46* (2006.01)

(52) U.S. Cl. ........ 507/269; 106/672; 106/677; 106/678; 106/820; 106/823; 507/203; 507/217; 507/221; 507/224; 507/252

(58) Field of Classification Search .................. 507/269, 507/203, 217, 221, 224, 252; 106/672, 677, 106/678, 820, 823
See application file for complete search history.

(56) References Cited

U.S. PATENT DOCUMENTS

| | | |
|---|---|---|
| 2,094,316 A | 9/1937 | Cross et al. |
| 2,329,940 A | 9/1943 | Ponzer |
| 2,842,205 A | 7/1958 | Allen et al. |
| 2,848,051 A | 8/1958 | Williams |
| 2,871,133 A | 1/1959 | Palonen et al. |
| 2,880,096 A | 3/1959 | Hurley |
| 2,890,169 A | 6/1959 | Prokop |
| 2,945,769 A | 7/1960 | Gama et al. |
| 3,168,139 A | 2/1965 | Kennedy et al. |
| 3,381,748 A | 5/1968 | Peters et al. |
| 3,454,095 A | 7/1969 | Messenger et al. |
| 3,467,193 A | 9/1969 | Messenger |
| 3,499,491 A | 3/1970 | Wyant et al. |
| 3,557,876 A | 1/1971 | Tragesser |
| 3,748,159 A | 7/1973 | George |
| 3,876,005 A | 4/1975 | Fincher et al. |
| 3,887,009 A | 6/1975 | Miller et al. |
| 3,887,385 A | 6/1975 | Quist et al. |
| 4,018,617 A | 4/1977 | Nicholson |
| 4,031,184 A | 6/1977 | McCord |
| 4,036,301 A | 7/1977 | Powers et al. |
| 4,101,332 A | 7/1978 | Nicholson |
| 4,176,720 A | 12/1979 | Wilson |
| 4,268,316 A | 5/1981 | Wills et al. |
| 4,341,562 A | 7/1982 | Ahlbeck |
| RE31,190 E | 3/1983 | Detroit et al. |
| 4,407,677 A | 10/1983 | Wills et al. |
| 4,432,800 A | 2/1984 | Kneller et al. |
| 4,435,216 A | 3/1984 | Diehl et al. |
| 4,436,850 A | 3/1984 | Burdick et al. |
| 4,460,292 A | 7/1984 | Durham et al. |
| 4,494,990 A | 1/1985 | Harris |
| 4,515,635 A | 5/1985 | Rao et al. |
| 4,519,452 A | 5/1985 | Tsao et al. |
| 4,555,269 A | 11/1985 | Rao et al. |
| 4,614,599 A | 9/1986 | Walker |
| 4,624,711 A | 11/1986 | Styron |
| 4,633,950 A | 1/1987 | Delhommer et al. |
| 4,676,317 A | 6/1987 | Fry et al. |
| 4,676,832 A | 6/1987 | Childs et al. |
| 4,700,777 A | 10/1987 | Luers |
| 4,741,782 A | 5/1988 | Styron |
| 4,784,223 A | 11/1988 | Worrall et al. |
| 4,883,125 A | 11/1989 | Wilson et al. |
| 4,941,536 A | 7/1990 | Brothers et al. |

(Continued)

FOREIGN PATENT DOCUMENTS

CA 2064682 4/1992

(Continued)

OTHER PUBLICATIONS

Foreign Office Action for Canadian Application No. 2658155 dated Nov. 16, 2010.

(Continued)

*Primary Examiner* — Timothy J. Kugel
(74) *Attorney, Agent, or Firm* — Craig W. Roddy; Tumey LLP

(57) ABSTRACT

Of the many compositions provided herein, an embodiment includes a foamed cement composition comprising a cementitious component, an oil-swellable particle comprising at least one swellable elastomer selected from the group consisting of acrylate butadiene rubber, polyacrylate rubber, isoprene rubber, choloroprene rubber, butyl rubber, brominated butyl rubber, chlorinated butyl rubber, chlorinated polyethylene, neoprene rubber, styrene butadiene block copolymer, sulphonated polyethylene, ethylene acrylate rubber, epichlorohydrin ethylene oxide copolymer, ethylene-propylene rubber, ethylene vinyl acetate copolymer, fluorosilicone rubber, silicone rubber, and combinations thereof, a foaming and stabilizing surfactant, gas, and water. Another embodiment includes a foamed cement composition comprising a cementitious component, an oil-swellable particle comprising a block copolymer of styrene butadiene rubber, a foaming and stabilizing surfactant, and gas.

20 Claims, No Drawings

U.S. PATENT DOCUMENTS

| | | |
|---|---|---|
| 4,953,620 A | 9/1990 | Bloys et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,183,505 A | 2/1993 | Spinney |
| 5,213,160 A | 5/1993 | Nahm et al. |
| 5,215,585 A | 6/1993 | Luthra et al. |
| 5,238,064 A | 8/1993 | Dahl et al. |
| 5,252,128 A | 10/1993 | Gopalkrishnan |
| 5,266,111 A | 11/1993 | Barbour |
| 5,295,543 A | 3/1994 | Terry et al. |
| 5,305,831 A | 4/1994 | Nahm |
| 5,314,022 A | 5/1994 | Cowan et al. |
| 5,327,968 A | 7/1994 | Onan et al. |
| 5,337,824 A | 8/1994 | Cowan |
| 5,352,288 A | 10/1994 | Mallow |
| 5,358,044 A | 10/1994 | Hale et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan et al. |
| 5,423,379 A | 6/1995 | Hale et al. |
| 5,430,235 A | 7/1995 | Hooykaas et al. |
| 5,439,056 A | 8/1995 | Cowan |
| 5,456,751 A | 10/1995 | Zandi et al. |
| 5,458,195 A | 10/1995 | Totten et al. |
| 5,464,060 A | 11/1995 | Hale et al. |
| 5,472,051 A | 12/1995 | Brothers |
| 5,476,144 A | 12/1995 | Nahm et al. |
| 5,494,513 A | 2/1996 | Fu et al. |
| 5,499,677 A | 3/1996 | Cowan |
| 5,515,921 A | 5/1996 | Cowan et al. |
| 5,518,996 A | 5/1996 | Maroy et al. |
| 5,520,730 A | 5/1996 | Barbour |
| 5,529,624 A | 6/1996 | Riegler |
| 5,536,311 A | 7/1996 | Rodrigues |
| 5,542,782 A | 8/1996 | Carter et al. |
| 5,554,352 A | 9/1996 | Jaques et al. |
| 5,569,324 A | 10/1996 | Totten et al. |
| 5,575,841 A | 11/1996 | Dry |
| 5,580,379 A | 12/1996 | Cowan |
| 5,585,333 A | 12/1996 | Dahl et al. |
| 5,588,489 A | 12/1996 | Chatterji et al. |
| 5,641,584 A | 6/1997 | Andersen et al. |
| 5,660,624 A | 8/1997 | Dry |
| 5,663,230 A | 9/1997 | Haman |
| 5,673,753 A | 10/1997 | Hale et al. |
| 5,688,844 A | 11/1997 | Chatterji et al. |
| 5,711,383 A | 1/1998 | Terry et al. |
| 5,716,910 A | 2/1998 | Totten et al. |
| 5,728,654 A | 3/1998 | Dobson et al. |
| 5,779,787 A | 7/1998 | Brothers et al. |
| 5,795,924 A | 8/1998 | Chatterji et al. |
| 5,820,670 A | 10/1998 | Chatterji et al. |
| 5,851,960 A | 12/1998 | Totten et al. |
| 5,866,516 A | 2/1999 | Costin |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 5,989,334 A | 11/1999 | Dry |
| 6,022,408 A | 2/2000 | Stokes et al. |
| 6,060,434 A | 5/2000 | Sweatman et al. |
| 6,060,535 A | 5/2000 | Villar et al. |
| 6,063,738 A | 5/2000 | Chatterji et al. |
| 6,098,711 A | 8/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,261,360 B1 | 7/2001 | Dry |
| 6,277,189 B1 | 8/2001 | Chugh |
| 6,312,515 B1 | 11/2001 | Barlet-Gouedard et al. |
| 6,315,042 B1 | 11/2001 | Griffith et al. |
| 6,328,106 B1 | 12/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,457,524 B1 | 10/2002 | Roddy |
| 6,478,869 B2 | 11/2002 | Reddy et al. |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,502,636 B2 | 1/2003 | Chatterji et al. |
| 6,508,305 B1 | 1/2003 | Brannon et al. |
| 6,516,884 B1 | 2/2003 | Chatterji et al. |
| 6,524,384 B2 | 2/2003 | Griffith et al. |
| 6,527,849 B2 | 3/2003 | Dry |
| 6,547,871 B2 | 4/2003 | Chatterji et al. |
| 6,547,891 B2 | 4/2003 | Linden et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,610,139 B2 | 8/2003 | Reddy et al. |
| 6,626,243 B1 | 9/2003 | Go Boncan |
| 6,631,766 B2 | 10/2003 | Brothers et al. |
| 6,645,288 B1 | 11/2003 | Dargaud et al. |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,708,760 B1 | 3/2004 | Chatterji et al. |
| 6,716,282 B2 | 4/2004 | Griffith et al. |
| 6,729,405 B2 | 5/2004 | DiLullo et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,811,603 B2 | 11/2004 | Brothers et al. |
| 6,823,940 B2 | 11/2004 | Reddy et al. |
| 6,832,651 B2 | 12/2004 | Ravi et al. |
| 6,832,652 B1 | 12/2004 | Dillenbeck et al. |
| 6,835,243 B2 | 12/2004 | Brothers et al. |
| 6,837,316 B2 | 1/2005 | Reddy et al. |
| 6,846,357 B2 | 1/2005 | Reddy et al. |
| 6,848,519 B2 | 2/2005 | Reddy et al. |
| 6,887,833 B2 | 5/2005 | Brothers et al. |
| 6,889,766 B2 | 5/2005 | Creel et al. |
| 6,889,767 B2 | 5/2005 | Reddy et al. |
| 6,902,001 B2 | 6/2005 | Dargaud et al. |
| 6,904,971 B2 | 6/2005 | Brothers et al. |
| 6,907,929 B2 | 6/2005 | Leroy-Delage et al. |
| 6,908,508 B2 | 6/2005 | Brothers |
| 6,911,078 B2 | 6/2005 | Barlet-Gouedard et al. |
| 6,926,081 B2 | 8/2005 | Sweatman et al. |
| 6,962,201 B2 | 11/2005 | Brothers |
| 7,007,755 B2 | 3/2006 | Reddy et al. |
| 7,022,179 B1 | 4/2006 | Dry |
| 7,022,755 B1 | 4/2006 | Chatterji et al. |

| | | |
|---|---|---|
| 7,026,272 B2 | 4/2006 | Reddy et al. |
| 7,048,053 B2 | 5/2006 | Santra et al. |
| 7,059,415 B2 | 6/2006 | Bosma et al. |
| 7,077,203 B1 | 7/2006 | Roddy et al. |
| 7,138,446 B2 | 11/2006 | Reddy et al. |
| 7,143,828 B2 | 12/2006 | Reddy et al. |
| 7,143,832 B2 | 12/2006 | Freyer |
| 7,156,173 B2 | 1/2007 | Mueller |
| 7,172,022 B2 | 2/2007 | Reddy et al. |
| 7,174,962 B1 | 2/2007 | Roddy et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,264,053 B2 | 9/2007 | Vargo, Jr. et al. |
| 7,284,609 B2 | 10/2007 | Roddy et al. |
| 7,284,611 B2 | 10/2007 | Reddy et al. |
| 7,294,194 B2 | 11/2007 | Reddy et al. |
| 7,296,597 B1 | 11/2007 | Freyer et al. |
| 7,303,014 B2 | 12/2007 | Reddy et al. |
| 7,335,252 B2 | 2/2008 | Roddy et al. |
| 7,337,841 B2 | 3/2008 | Ravi |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,351,279 B2 | 4/2008 | Brothers |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,395,860 B2 | 7/2008 | Roddy et al. |
| 7,404,440 B2 | 7/2008 | Reddy et al. |
| 7,404,855 B2 | 7/2008 | Chatterji et al. |
| 7,409,990 B1 | 8/2008 | Burts et al. |
| 7,409,991 B2 | 8/2008 | Reddy et al. |
| 7,422,060 B2 | 9/2008 | Hammami et al. |
| 7,445,669 B2 | 11/2008 | Roddy et al. |
| 7,451,817 B2 | 11/2008 | Reddy et al. |
| 7,461,696 B2 | 12/2008 | Nguyen et al. |
| 7,478,675 B2 | 1/2009 | Roddy et al. |
| 7,478,678 B2 | 1/2009 | Farrar et al. |
| 7,482,309 B2 | 1/2009 | Ravi et al. |
| 7,607,482 B2 | 10/2009 | Roddy et al. |
| 7,607,484 B2 | 10/2009 | Roddy et al. |
| 7,627,870 B1 | 12/2009 | Michaeli et al. |
| 7,631,692 B2 | 12/2009 | Roddy et al. |
| 7,674,332 B2 | 3/2010 | Roddy et al. |
| 7,743,828 B2 | 6/2010 | Roddy et al. |
| 7,784,542 B2 | 8/2010 | Roddy et al. |
| 7,789,150 B2 | 9/2010 | Roddy et al. |
| 2002/0033121 A1 | 3/2002 | Marko |
| 2002/0073897 A1 | 6/2002 | Trato |
| 2002/0117090 A1 | 8/2002 | Ku |
| 2003/0116065 A1 | 6/2003 | Griffith et al. |
| 2003/0116887 A1 | 6/2003 | Scott |
| 2003/0167970 A1 | 9/2003 | Polston |
| 2004/0007162 A1 | 1/2004 | Morioka et al. |
| 2004/0040475 A1 | 3/2004 | De La Roij et al. |
| 2004/0055748 A1 | 3/2004 | Reddy et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0129181 A1 | 7/2004 | Lalande et al. |
| 2004/0144537 A1 | 7/2004 | Reddy et al. |
| 2004/0168802 A1 | 9/2004 | Creel et al. |
| 2004/0171499 A1 | 9/2004 | Ravi et al. |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0244978 A1 | 12/2004 | Shaarpour |
| 2004/0256102 A1 | 12/2004 | Trato |
| 2004/0261990 A1 | 12/2004 | Bosma et al. |
| 2004/0262000 A1 | 12/2004 | Morgan et al. |
| 2005/0000734 A1 | 1/2005 | Getzlaf et al. |
| 2005/0034867 A1 | 2/2005 | Griffith et al. |
| 2005/0056191 A1 | 3/2005 | Brothers et al. |
| 2005/0061206 A1 | 3/2005 | Reddy et al. |
| 2005/0061505 A1 | 3/2005 | Caveny et al. |
| 2005/0072599 A1 | 4/2005 | Luke et al. |
| 2005/0077045 A1 | 4/2005 | Chatterj et al. |
| 2005/0084334 A1 | 4/2005 | Shi et al. |
| 2005/0098317 A1 | 5/2005 | Reddy et al. |
| 2005/0113260 A1 | 5/2005 | Wood |
| 2005/0113262 A1 | 5/2005 | Ravi et al. |
| 2005/0133221 A1 | 6/2005 | Chatterji et al. |
| 2005/0199401 A1 | 9/2005 | Patel et al. |
| 2006/0025312 A1 | 2/2006 | Santra et al. |
| 2006/0086501 A1 | 4/2006 | Creel et al. |
| 2006/0086503 A1 | 4/2006 | Reddy et al. |
| 2006/0089851 A1 | 4/2006 | Silby et al. |
| 2006/0122071 A1 | 6/2006 | Reddy et al. |
| 2006/0162926 A1 | 7/2006 | Roddy |
| 2006/0166834 A1 | 7/2006 | Roddy |
| 2006/0213662 A1 | 9/2006 | Creel et al. |
| 2006/0260512 A1 | 11/2006 | Nordmeyer |
| 2006/0278131 A1 | 12/2006 | Hunt |
| 2007/0012436 A1 | 1/2007 | Freyer |
| 2007/0017676 A1 | 1/2007 | Reddy et al. |
| 2007/0056479 A1 | 3/2007 | Gray |
| 2007/0062691 A1 | 3/2007 | Reddy et al. |
| 2007/0102157 A1 | 5/2007 | Rodldy et al. |
| 2007/0137528 A1 | 6/2007 | LeRoy-Delage et al. |
| 2007/0151484 A1 | 7/2007 | Reddy et al. |
| 2007/0151724 A1 | 7/2007 | Ohmer et al. |
| 2007/0151730 A1 | 7/2007 | Reddy et al. |
| 2007/0186820 A1 | 8/2007 | O'Hearn |
| 2007/0204765 A1 | 9/2007 | LeRoy-Delage et al. |
| 2007/0227734 A1 | 10/2007 | Freyer |
| 2007/0246225 A1 | 10/2007 | Hailey, Jr. et al. |
| 2007/0255457 A1 | 11/2007 | Whitcomb et al. |
| 2008/0017376 A1 | 1/2008 | Badalamenti et al. |
| 2008/0099203 A1 | 5/2008 | Mueller et al. |
| 2008/0108524 A1 | 5/2008 | Willberg et al. |
| 2008/0135250 A1 | 6/2008 | Bosma et al. |
| 2008/0156491 A1 | 7/2008 | Roddy et al. |
| 2008/0261027 A1 | 10/2008 | Li et al. |
| 2008/0261834 A1 | 10/2008 | Simon |
| 2009/0044726 A1 | 2/2009 | Brouillette et al. |
| 2009/0071650 A1 | 3/2009 | Roddy |
| 2009/0088348 A1 | 4/2009 | Roddy |
| 2009/0114126 A1 | 5/2009 | Roddy |
| 2009/0120640 A1 | 5/2009 | Kulakofsky |
| 2009/0120644 A1 | 5/2009 | Roddy |
| 2009/0124522 A1 | 5/2009 | Roddy |
| 2009/0200029 A1 | 8/2009 | Roddy |
| 2009/0320720 A1 | 12/2009 | Roddy et al. |
| 2010/0041792 A1 | 2/2010 | Roddy et al. |
| 2010/0044043 A1 | 2/2010 | Roddy et al. |
| 2010/0089581 A1 | 4/2010 | Nguyen et al. |
| 2010/0258312 A1 | 10/2010 | Brenneis et al. |
| 2010/0273912 A1 | 10/2010 | Roddy et al. |
| 2010/0282466 A1 | 11/2010 | Brenneis et al. |
| 2010/0292365 A1 | 11/2010 | Roddy et al. |
| 2010/0294496 A1 | 11/2010 | Woytowich et al. |

FOREIGN PATENT DOCUMENTS

| | | |
|---|---|---|
| CA | 2336077 | 1/2000 |
| CA | 2153372 | 1/2006 |
| CN | 1054620 C | 11/1997 |
| EP | 0814067 | 12/1997 |
| EP | 1092693 | 4/2001 |
| EP | 1236701 | 9/2002 |
| EP | 1394137 | 7/2003 |
| EP | 1348831 | 10/2003 |
| EP | 2025732 A1 | 2/2009 |
| GB | 1469954 | 4/1997 |
| GB | 2429725 | 3/2007 |
| GB | 2448099 A | 10/2008 |
| JP | 52117316 | 10/1977 |
| JP | 10110487 | 4/1998 |
| RU | 2026959 | 1/1995 |
| RU | 2262497 | 10/2005 |
| SU | 1373781 | 2/1988 |
| WO | WO 83/01443 | 4/1983 |

| WO | WO 98/54108 | 12/1998 |
| WO | WO 00/63134 | 1/2000 |
| WO | WO 03/008756 | 1/2003 |
| WO | 03/031364 | 4/2003 |
| WO | WO 2004/057715 | 7/2004 |
| WO | WO 2004/101951 | 11/2004 |
| WO | WO2004/101951 | 11/2004 |
| WO | WO 2004/101952 | 11/2004 |
| WO | WO 2004109053 A2 | 12/2004 |
| WO | WO 2004109053 A3 | 12/2004 |
| WO | WO 2005/047212 | 5/2005 |
| WO | WO 2005/061846 | 7/2005 |
| WO | WO 2006/032841 | 3/2006 |
| WO | WO 2006/053896 | 5/2006 |
| WO | WO 2007028952 | 3/2007 |
| WO | WO 2007/048999 | 5/2007 |
| WO | WO 2007/128945 | 11/2007 |
| WO | WO 2009/015725 | 2/2009 |
| WO | WO2009/138747 | 11/2009 |

OTHER PUBLICATIONS

U.S. Appl. No. 12/975,196, filed Dec. 21, 2010.
PCT International Preliminary Report on Patentability (Chapter 1) for International Application No. PCT/GB2009/002018 dated Mar. 24, 2011.
U.S. Appl. No. 12/833,189, filed Jul. 9, 2010, Roddy.
U.S. Appl. No. 12/895,436, filed Sep. 30, 2010, Benkley.
USPTO Office Action for U.S. Appl. No. 12/844,612 dated Oct. 1, 2010.
Foreign Office Action for EP Application No. 06 779 191.3 dated Mar. 31, 2010.
Foreign Office Action for CN Application No. 200680042004.X dated May 12, 2010.
Foreign Office Action for RU Application No. 2008113766 dated Jul. 14, 2009.
Foreign Office Action for RU Application No. 2008113766 dated Apr. 8, 2010.
Foreign Office Action for EP 06 794 646.7 dated Sep. 24, 2010.
U.S. Appl. No. 12/152,327, filed May 14, 2008, Roddy.
U.S. Appl. No. 12/364,998, filed Feb. 3, 2009, Roddy.
U.S. Appl. No. 12/558,197, filed Sep. 11, 2009, Roddy.
Bartlet-Gouedard, "A Non-Conventional Way of Developing Cement Slurry for Geothermal Wells", 2001.
Poon, "A Study of the Hydration of Natural Zeolite Blended Cement Pastes", 1999.
"Beneficial use of Solid Waste in Maine", Apr. 14, 2005.
Smith, "Cementing" Society of Professional Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naiqian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art", Petroleum Engineer International, Apr. 1978.
Sugama, "Carbonation of Hydrothermally Treated Phosphate-Bonded Calcium Aluminate Cements", pp. 1-9 (undated but admitted as prior art).
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
HES Brochure "AQF-2 Foaming Agent", 1999.
HES Brochure "Pozmix Cement and Pozmix 140" (undated but admitted as prior art).
HES Brochure "SCR-100 Cement Retarder A Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
LAFARGE brochure "TerraCem™", Aug. 2006.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-793, 2005.
Answer 13 of 24 Chemical Abstracts on STN "Manufacture of ceramic particles from floatstone and fly ash", CN 1182062 (abstract only) (undated but admitted as prior art).
Answer 3 of 24 Chemical Abstracts on STN "Effect of cement kiln dust substitution on chemical and physical properties and compressive strength of Portland and slag cements", Adb El-aleem et al. (abstract only), 2005.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/257,261, Aug. 10, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/402,741, Oct. 24, 2007.
Office Action from U.S. Appl. No. 11/223,669, Apr. 8, 2008.
Foreign Search Report from a Related Application, Sep. 9, 2005.
Foreign Search Report from a Related Application, Jul. 5, 2006.
Foreign Search Report from a Related Application, Oct. 27, 2006.
Foreign Search Report from a Related Application, Nov. 2, 2006.
Foreign Search Report from a Related Application, Dec. 1, 2006.
Foreign Search Report from a Related Application, Dec. 19, 2006.
Foreign Search Report from a Related Application, May 8, 2007.
Office Action from U.S. Appl. No. 12/263,800, May 1, 2009.
Nelson, "Well Cementing", 1990.
"Fly Ash Resource Center-Pozzolan," available at http://www.rmajko.com/pozzolan.htm, Apr. 20, 2009.

Bosma, et al., "Design Approach to Sealant Selection for the Life of the Well," Society of Petroleum Engineers, SPE 56536, pp. 1-14, 1999.
Kleverlaan, et al., "Deployment of Swelling Elastomer Packers in Sheell E&P," Society of Petroleum Engineers, SPE/IADS 92346, pp. 1-5, 2005.
Kennedy, et al., "The Use of Swell Packers as a Replacement and Alternative to Cementing," Society of Petroleum Engineers, SPE 95713, pp. 1-4, 2005.
Laws, et al., PDOB's Proactive Approach to Solving Zonal Isolation Challenge in Harweel HP Wells Using Swell Packers,: Society of Petro. Eng'r., IADS/SPE 100361, pp. 1-7, 2006.
Schlumberger brochure entitled "Futur Slurry Systems", 2007.
Cavanagh, et al., "Self-Healing Cement-Novel Technology to Achieve Leak-Free Wells," Society of Petroleum Engineers, SPE/IADS 105781, pp. 1-13, Feb. 2007.
Antonio, et al., "Swelling Packer Technology Eliminates Problems in Difficult Zonal Isolation in Tight-Gas Reservoir Completion," Society of Petro. Eng'r., SPE 107578, 2007.
Keshka, et al., "Practical Uses of Swellable Packer Technology to Reduce Water Cut: Case Studies From the Middle East and Other Areas," Society of Petroleum Engineers, SPE 108613, 2007.
Halliburton brochure entitled "Cement Assurance MC Tool", Oct. 2007.
Halliburton brochure entitled "Cement Assurance MA Tool", Oct. 2007.
Halliburton brochure entitled "Cement Assurance HE Tool", Oct. 2007.
Halliburton brochure entitled "Well Life III Cementing Service", Apr. 2008.
"Water-Swellable Polymer Networks—From Hydrogels to Superabsorbers," available at http://www.sigmaaldrich.com, May 22, 2008.
"Volclay Waterstop-RX," CETCO, pp. 1-4, May 2002.
Halliburton brochure entitled "LifeCem Cements," available at http://www.halliburton.com, printed from the Internet, Feb. 3, 2009.
USPTO Office Action for U.S. Appl. No. 12/152,327, Sep. 22, 2008.
USPTO Office Action for U.S. Appl. No. 12/420,630, Aug. 3, 2009.
EPO Application No. 06794648.3 Examination Report, pp. 1-8, Apr. 17, 2009.
EPO Application No. 06779194.7 Examination Report, pp. 1-5, May 29, 2009.
USPTO Office Action for U.S. Appl. No. 12/283,398, Jul. 15, 2009.
Moroni et al., "Overcoming the Weak Link in Cement Hydraulic Isolation," Society of Petroleum Engineers, SPE 110523, 2007.
Roth et al., "Innovative Hydraulic Isolation Material Preserves Well Integrity," Society of Petroleum Engineers, IADC/SPE 112715, 2008.
Bouras et al., "Responsive Cementing Material Prevents Annular Leaks in Gas Wells," Society of Petroleum Engineers, SPE 116757, 2008.
Moroni et al., "Zonal Isolation in Reservoir Containing Co2 and H2S," Society of Petroleum Engineers, IADC/SPE 112703, 2008.
Ravi et al., "Maximizing Heavy-Oil Recovery by Containing Steam trhough Optimized Cementing," Society of Petroleum Engineers, SPE 117516, 2008.
Ravi et al., "Interventionless Zonal Isolation," E&P, May 2008.
Hunter et al., "Life-of-Well Isolation Takes Intelligence," E&P, Sep. 2007.
Schlumberger brochure entitled FUTUR: Active Set-Cement Technology for Long-Term Zonal Isolation, 2007.
"Waterstop-RX Bentonite Waterstop," Master Guideline Specification for Cast-in-Place Concrete, Section 032500, Jan. 2006.
Chang et al., "Material Properties of Portland Cement Paste with Nano-Montmorillonite," J. Material Science, May 18, 2007.
USPTO Office Action for U.S. Appl. No. 12/283,398 (Notice of Allowance), Sep. 8, 2009.
USPTO Office Action for U.S. Appl. No. 12/420,630 (Notice of Allowance), Sep. 14, 2009.
USPTO Office Action for U.S. Appl. No. 12/263,800 (Notice of Allowance), Aug. 31, 2009.
USPTO Office Action for U.S. Appl. No. 12/152,327 (Notice of Allowance), Sep. 23, 2009.
USPTO Notice of Allowance for U.S. Appl. No. 12/609,993 dated Jul. 26, 2010.
Foreign Office Action for EP Application No. 06 779 194.7 dated Jul. 2, 2010.
USPTO Office Action for U.S. Appl. No. 12/558,097 dated Jun. 30, 2010.
Office Action for U.S. Appl. No. 12/609,993 dated Jun. 15, 2010.
Office Action for U.S. Appl. No. 12/609,993 dated May 6, 2010.
Notice of Allowance for U.S. Appl. No. 12/606,381 dated Apr. 30, 2010.
English language translation of Foreign Office Action for Application No. RU2008113765 dated Jul. 6, 2009.
Foreign Office Action for Canadian Patent Application No. 2621835 dated Oct. 2, 2009.
Foreign Office Action for Canadian Patent Application No. 2621832 dated Oct. 5, 2009.
Foreign Office Action for Canadian Application No. 2650630 dated Oct. 14, 2010.
Foreign Office Action for EP Application No. 09 713 469.6 dated Sep. 28, 2010.
PCT International Search Report for International Application No. PCT/GB2009/000295 dated Jul. 30, 2009.
PCT Written Opinion of the International Searching Authority for International Application No. PCT/GB2009/000295 dated Jul. 30, 2009.
PCT International Preliminary Report on Patentability for International Application No. PCT/GB2009/000295 dated Aug. 24, 2010.
USPTO Office Action for U.S. Appl. No. 12/349,676 dated Nov. 4, 2009.
English language translation of Foreign Office Action for Chinese Application No. 200680042014.3, dated Dec. 1, 2010.
Office Action from U.S. Appl. No. 12/844,612, dated Jan. 28, 2011.
PCT International Search Report and Written Opinion for International Application No. PCT/GB2009/002018 dated Nov. 17, 2009.
PCT International Search Report and Written Opinion for International Application No. PCT/GB2010/001986 dated Jan. 19, 2011.
PCT International Search Report and Written Opinion for International Application No. PCT/GB2010/002011 dated Feb. 4, 2011.
PCT International Search Report and Written Opinion for International Application No. PCT/GB2009/002598 dated Feb. 11, 2010.
PCT International Search Report and Written Opinion for International Application No. PCT/GB2009/002597 dated Feb. 1, 2010.
English language translation of USSR Patent No. RU 2026959, publication date Jan. 20, 1995.
Office Action for U.S. Appl. No. 12/606,381 dated Mar. 23, 2010.
Office Action for U.S. Appl. No. 12/609,993 dated Apr. 9, 2010.
USPTO Office Action for U.S. Appl. No. 12/558,097, dated Sep. 3, 2010.
Foreign Office Action for EP Application No. 06 779 199.6 dated Mar. 1, 2010.
Smith, "Cementing," Society of Petroleum Engineers, p. 38. 1990.
HES Brochure, "Halad-23 Fluid Loss Additive," 2000.
HES Brochure, "Halad-344 Fluid Loss Additive," 1998.
HES Brochure, "Halad-413 Fluid Loss Additive," 1999.
HES Brochure, Howco Suds Surfactant, 1999.
HES Brochure, "HR-12 Cement Retarder," 1999.
HES Brochure, "HR-15 Cement Retarder," 1999.
HES Brochure, "HR-25 Cement Retarder," 1999.
HES Brochure, "HR-4 Cement Retarder," 1999.
HES Brochure, "HR-5 Cement Retarder," 1998.
HES Brochure, "HR-7 Cement Retarder," 1999.
HES Brochure, "Pozmix Z Cement Additive," 1999.
Lafarge MSDS "Cement Kiln Dust," Mar. 3, 2005.
Lafarge MSDA "LaFarge Blended Cement (cement)" Mar. 3, 2005.
TXI Material Safety Data Sheet for Pressur-Seal, Oct. 2003.
USPTO Office Action for U.S. Appl. No. 12/152,327, Jan. 22, 2000.
USPTO Office Action for U.S. Appl. No. 12/152,327, Feb. 24, 2009.
USPTO Office Action for U.S. Appl. No. 12/152,327, Jul. 9, 2009.

FOAMED CEMENT COMPOSITIONS COMPRISING OIL-SWELLABLE PARTICLES

CROSS-REFERENCES TO RELATED APPLICATIONS

The present application is a divisional of U.S. patent application Ser. No. 12/263,800, entitled "Foamed Cement Compositions Comprising Oil-Swellable Particles and Methods of Use," filed on Nov. 3, 2008, now U.S. Pat. No. 7,607,484, which is a continuation-in-part of U.S. patent application Ser. No. 12/283,398, filed on Sep. 11, 2008, entitled "Settable Compositions Comprising Cement Kiln Dust and Swellable Particles," now U.S. Pat. No. 7,607,482, which is a continuation-in-part of U.S. patent application Ser. No. 11/223,669, filed on Sep. 9, 2005, now U.S. Pat. No. 7,445,669, entitled "Settable Compositions Comprising Cement Kiln Dust and Additive(s)." U.S. patent application Ser. No. 12,263,800 is also a continuation-in-part of U.S. patent application Ser. No. 12/152,327, filed on May 14, 2008, entitled "Extended Cement Compositions Comprising Oil-Swellable Particles and Associated Methods," now U.S. Pat. No. 7,617,870. The disclosures of these related applications are incorporated herein by reference in their entirety.

BACKGROUND

The present invention relates to cementing operations, and more particularly in certain embodiments, to the application of an oil-swellable particle to foamed cement compositions, and methods of using such compositions in surface and subterranean applications.

Cement compositions are commonly utilized above ground (e.g., in the construction industry) and in subterranean operations, particularly subterranean well completion and remedial operations. For example, cement compositions are used in primary cementing operations whereby pipe strings such as casings and liners may be cemented in well bores. In performing primary cementing, hydraulic cement compositions may be pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surface of the pipe string to the walls of the well bore. Cement compositions also may be used in remedial cementing operations such as plugging highly permeable zones or fractures in well bores, plugging cracks and holes in pipe strings, and the like.

Cement compositions utilized in subterranean operations may be lightweight to prevent excessive hydrostatic pressure from being exerted on subterranean formations penetrated by the well bore, whereby the formations may be unintentionally fractured. One type of lightweight cement composition is a foamed cement composition, i.e., a cement composition that comprises a gas and a foaming surfactant. In addition to being lightweight, the gas contained in the foamed cement composition may improve the ability of the composition to maintain pressure and prevent the flow of formation fluids into and through the cement composition during its transition time, i.e., the time during which the cement composition changes from a true fluid to a set mass. Foamed cement compositions may be advantageous because they can have low fluid loss properties and may act to prevent the loss of fluid during circulation. Additionally, foamed cement compositions when set should have a lower modulus of elasticity than non-foamed cements, which is often desirable as it enables the resultant set cement, inter alia, to resist hoop stresses exerted on the set cement in the annulus.

Once set, the cement sheath may be subjected to a variety of cyclic, shear, tensile, impact, flexural, and/or compressive stresses that may lead to failure of the cement sheath. Such failure may be the result of fractures, cracks, and/or debonding of the cement sheath from the pipe string and/or the formation. Undesirably, cement-sheath failure may lead to loss of zonal isolation, resulting, for example, in the undesirable migration of fluids between formation zones. This may lead to undesirable consequences such as lost production, costly remedial operations, environmental pollution, hazardous rig operations resulting from unexpected fluid flow from the formation caused by the loss of zonal isolation, and/or hazardous production operations. Furthermore, failure of the cement sheath also may be caused by forces exerted by shifts in subterranean formations surrounding the well bore, cement erosion, and repeated impacts from the drill bit and the drill pipe.

SUMMARY

The present invention relates to cementing operations, and more particularly in certain embodiments, to the application of an oil-swellable particle to foamed cement compositions, and methods of using such compositions in surface and subterranean applications.

An embodiment of the present invention provides a method comprising: introducing a foamed cement composition into a subterranean formation, wherein the foamed cement composition comprises: a cementitious component; a foaming and stabilizing surfactant; an oil-swellable particle; gas; and water; and allowing the settable composition to set in the subterranean formation.

Another embodiment of the present invention provides a method comprising: introducing a foamed cement composition into an annulus between a pipe string and a subterranean formation, wherein the foamed cement composition comprises comprising: a cementitious component; a foaming and stabilizing surfactant; an oil-swellable particle; gas; and water; and allowing the settable composition to set in the annulus.

Another embodiment of the present invention provides a foamed cement composition comprising: a cementitious component, a foaming and stabilizing surfactant, a swellable particle, gas, and water.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to cementing operations, and more particularly in certain embodiments, to the application of an oil-swellable particle to foamed cement compositions, and methods of using such compositions in surface and subterranean applications.

The foamed cement compositions of the present invention generally comprise a cementitious component, water, a gas, a foaming and stabilizing surfactant, and an oil-swellable particle. As used herein, the term "cementitious component" refers to a material or combination of materials that sets and hardens by reaction with water. The foamed cement compositions of the present invention should have a density suitable for a particular application as desired by those of ordinary skill in the art, with the benefit of this disclosure. In some embodiments, the foamed settable compositions of the present invention may have a density in the range of from about 8 ppg to about 13 ppg.

Embodiments of the foamed cement compositions of the present invention comprise a cementitious component that may comprise cement kiln dust ("CKD.") "CKD," as that term is used herein, refers to a partially calcined kiln feed which may be removed from the gas stream and collected in a dust collector during the manufacture of cement. CKD generally may comprise a variety of oxides, such as $SiO_2$, $Al_2O_3$, $Fe_2O_3$, CaO, MgO, $SO_3$, $Na_2O$, and $K_2O$. The CKD may be included in the foamed cement compositions in an amount sufficient to provide the desired compressive strength, density, and/or cost reduction. In some embodiments, the CKD may be present in the settable compositions of the present invention in an amount of at least about 25% by weight of the cementitious component. In some embodiments, the CKD may be present in the settable compositions of the present invention in an amount in the range of from about 1% to about 75% by weight of the cementitious component. In some embodiments, the CKD may be present in the settable compositions of the present invention in an amount in the range of from about 25% to about 50% by weight of the cementitious component.

Embodiments of the foamed cement compositions of the present invention may comprise a cementitious component that also comprises a hydraulic cement. In certain embodiments, the cementitious component may comprise hydraulic cement and CKD. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention include those classified as Classes A through H according to American Petroleum Institute, *API Specification for Materials and Testing for Well Cements*, API Specification 10, Fifth Ed., Jul. 1, 1990. In certain embodiments, API Class A, C, G and H hydraulic cements may be preferred.

Where present, the hydraulic cement generally may be included in the cement compositions in an amount sufficient to provide the desired compressive strength, density, and/or cost. In some embodiments, the hydraulic cement may be present in the cement compositions of the present invention in an amount of about 0.1% to about 100% by weight of cementitious materials. In some embodiments, the hydraulic cement may be present in the cement compositions of the present invention in an amount of about 0.1% to about 95% by weight of cementitious materials. In some embodiments, the hydraulic cement may be present in the cement compositions of the present invention in an amount of about 20% to about 95% by weight by weight of cementitious materials. In some embodiments, the hydraulic cement may be present in the cement compositions of the present invention in an amount in the range of from about 50% to about 90% by weight of cementitious materials.

In some embodiments, a pozzolana cement that may be suitable for use comprises fly ash. As used herein, "fly ash" refers to the residue from the combustion of powdered or ground coal, wherein the fly ash carried by flue gases may be recovered, for example, by electrostatic precipitation. A variety of fly ashes may be suitable, including fly ash classified as Class C and Class F fly ash according to American Petroleum Institute, *API Specification for Materials and Testing for Well Cements*, API Specification 10, Fifth Ed., Jul. 1, 1990. Class C fly ash comprises both silica and lime so that, when mixed with water, it sets to form a hardened mass. Class F fly ash generally does not contain sufficient lime, so an additional source of calcium ions is required for the Class F fly ash to form a cement composition with water. In some embodiments, lime may be mixed with Class F fly ash in an amount in the range of from about 0.1% to about 25% by weight of the fly ash. In some instances, the lime may be hydrated lime. Suitable examples of fly ash include, but are not limited to, "POZMIX® A" cement additive, commercially available from Halliburton Energy Services, Inc., Duncan, Okla.

Where present, the fly ash generally may be included in the cement compositions in an amount sufficient to provide the desired compressive strength, density, and/or cost. In some embodiments, the fly ash may be present in the cement compositions of the present invention in an amount of about 5% to about 75% by weight of cementitious materials. In some embodiments, the fly ash may be present in the cement compositions of the present invention in an amount of about 5% to about 50% by weight of cementitious materials.

In some embodiments, a slag cement that may be suitable for use may comprise slag. As used herein, "slag" refers to a granulated, blast furnace by-product formed in the production of cast iron and generally comprises oxidized impurities found in iron ore. Slag generally does not contain sufficient basic material, so slag cement further may comprise a base to produce a cement composition that may react with water to set to form a hardened mass. Examples of suitable sources of bases include, but are not limited to, sodium hydroxide, sodium bicarbonate, sodium carbonate, lime, and combinations thereof.

Where present, the slag cement generally may be included in the cement compositions in an amount sufficient to provide the desired compressive strength, density, and/or cost. In some embodiments, the slag cement may be present in the cement compositions of the present invention in an amount of 0% to about 75% by weight of cementitious materials. In some embodiments, the slag cement may be present in the cement compositions of the present invention in an amount of about 5% to about 40% by weight of cementitious materials.

The water used in the foamed cement compositions of the present invention may be freshwater, saltwater (e.g., water containing one or more salts dissolved therein), brine (e.g., saturated saltwater produced from subterranean formations), or seawater, or combinations thereof. Generally, the water may be from any source, provided that it does not contain an excess of compounds that may adversely affect other components in the cement composition. The water may be present in an amount sufficient to form a pumpable slurry. More particularly, the water may be present in an amount in the range of from about 33% and about 200% by weight of the cementitious materials. In some embodiments, the water may be present in an amount in the range of from about 35% and about 70% by weight of cementitious materials.

The gas utilized in the foamed cement compositions of the present invention may be any gas suitable for foaming a cement composition, including, but not limited to, air or nitrogen, or combinations thereof. Generally, the gas should be present in the foamed cement compositions of the present invention in an amount sufficient to form a suitable foam. In certain embodiments, the gas may be present in an amount in the range of from about 10% and about 80% by volume of the composition.

Any suitable foaming and stabilizing surfactant may be used in the foamed cement composition of the present invention. Among other things, the foaming and stabilizing surfactants may facilitate the foaming of a cement composition and/or also stabilize the resultant foamed cement composition formed therewith. Suitable foaming and stabilizing surfactants may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable hydrolyzed keratin is described in U.S. Pat. No. 6,547,871, the disclosure of which is incorporated herein by reference. Example of suitable mixtures of an ethoxylated alcohol ether sulfate surfactant, an alkyl or alkene amidopropyl betaine surfactant, and an alkyl or alkene dimethylamine oxide surfactant is described in U.S. Pat. No. 6,063,738, the disclosure of which is incorporated herein by reference. Examples of suitable aqueous solutions of an alpha-olefinic sulfonate surfactant and a betaine surfactant are described in U.S. Pat. No. 5,897,699, the disclosure of which is incorporated herein by reference. In one embodiment, the foaming and stabilizing surfactant comprises a mixture of an ammonium salt of an alkyl ether sulfate, a cocoamidopropyl betaine surfactant, a cocoamidopropyl dimethylamine oxide surfactant, sodium chloride, and water.

Generally, the foaming and stabilizing surfactants should be present in the foamed cement compositions of the present invention in an amount sufficient to provide a suitable foam. In some embodiments, the foaming and stabilizing surfactant may be present in an amount in the range of from about 0.8% and about 5% by volume of the water ("bvow") present in the foamed cement composition.

Embodiments of the foamed cement compositions may comprise an oil-swellable particle. As used herein, a particle is characterized as oil-swellable when it swells upon contact with oil. Oil-swellable particles suitable for use in embodiments of the present invention may generally swell by up to about 50% of their original size at the surface. Under downhole conditions, this swelling may be more, or less, depending on the conditions presented. For example, the swelling may be at least 10% at downhole conditions. In some embodiments, the swelling may be up to about 50% under downhole conditions. However, as those of ordinary skill in the art, with the benefit of this disclosure, will appreciate, the actual swelling when the oil-swellable particles are included in a foamed cement composition may depend on, for example, the concentration of the swellable particles included in the settable composition. In accordance with embodiments of the present invention, the swellable particles may be included in the settable composition, for example, to counteract the formation of cracks in the cement sheath and/or micro-annulus between the cement sheath and the pipe string or the formation. In general, the oil-swellable particles should be capable of swelling when contacted by oil to inhibit fluid flow through the crack and/or micro-annulus. Accordingly, the oil-swellable particles may prevent and/or reduce the loss of zonal isolation in spite of the formation of cracks and/or micro-annulus, potentially resulting in an improved annular seal for the foamed cement compositions.

An example of an oil-swellable particle that may be utilized in embodiments of the present invention comprises an oil-swellable elastomer. Oil-swellable elastomers suitable for use in embodiments of the present invention may generally swell by up to about 100% of their original size at the surface when contacted by oil. Under downhole conditions, this swelling may be more, or less, depending on the conditions presented. For example, the swelling may be at least 10% at downhole conditions. In some embodiments, the swelling may be up to about 50% under downhole conditions. However, as those of ordinary skill in the art, with the benefit of this disclosure, will appreciate, the actual swelling when the swellable elastomer is included in a foamed cement composition may depend on, for example, the concentration of the oil-swellable elastomer included in the foamed cement composition, downhole pressure, and downhole temperature, among other factors. Some specific examples of suitable swellable elastomers include, but are not limited to, natural rubber, acrylate butadiene rubber, polyacrylate rubber, isoprene rubber, choloroprene rubber, butyl rubber (IIR), brominated butyl rubber (BIIR), chlorinated butyl rubber (CIIR), chlorinated polyethylene (CM/CPE), neoprene rubber (CR), styrene butadiene copolymer rubber (SBR), styrene butadiene block copolymer rubber, sulphonated polyethylene (CSM), ethylene acrylate rubber (EAM/AEM), epichlorohydrin ethylene oxide copolymer (CO, ECO), ethylene-propylene rubber (EPM and EDPM), ethylene-propylene-diene terpolymer rubber (EPT), ethylene vinyl acetate copolymer, fluorosilicone rubbers (FVMQ), silicone rubbers (VMQ), poly 2,2,1-bicyclo heptene (polynorborneane), alkylstyrene, and crosslinked vinyl acrylate copolymers. Combinations of suitable oil-swellable elastomers may also be utilized. One example of a suitable oil-swellable elastomer comprises a block copolymer of a styrene butadiene rubber. Other swellable elastomers that behave in a similar fashion with respect to oil also may be suitable. Those of ordinary skill in the art, with the benefit of this disclosure, will be able to select an appropriate oil-swellable elastomer for use in the compositions of the present invention based on a variety of factors, including the application in which the composition will be used and the desired oil-swellable characteristics.

Where used, the oil-swellable particle generally may be included in the cement compositions in an amount sufficient to provide the desired mechanical properties. In some embodiments, the oil-swellable particle may be present in the foamed cement compositions in an amount up to about 27% bwoc (e.g., about 1%, about 5%, about 10%, about 15%, about 20%, about 25%, etc.), alternatively in a range of about 1% to about 25% bwoc, and alternatively in a range of about 4% to about 20% bwoc.

In addition, the oil-swellable particle that is utilized may have a wide variety of shapes and sizes of individual particles suitable for use in accordance with embodiments of the present invention. By way of example, the oil-swellable particle may have a well-defined physical shape as well as an irregular geometry, including the physical shape of platelets, shavings, fibers, flakes, ribbons, rods, strips, spheroids, beads, toroids, pellets, tablets, or any other physical shape. In some embodiments, the oil-swellable particle may have a particle size in the range of about 5 microns to about 1,500 microns. In some embodiments, the oil-swellable particle may have a particle size in the range of about 20 microns to about 500 microns. However, particle sizes outside these defined ranges also may be suitable for particular applications. Particle sizes may be measured using a laser light scattering particle size analyzer from the Malvern Company.

In certain embodiments, the settable compositions of the present invention further may comprise metakaolin. Generally, metakaolin is a white pozzolan that may be prepared by heating kaolin clay, for example, to temperatures in the range of from about 600° to about 800° C. In some embodiments, the metakaolin may be present in the settable compositions of the present invention in an amount in the range of from about 1% to about 50% by weight. In some embodiments, the metakaolin may be present in an amount in the range of from about 10% to about 50% by weight.

In certain embodiments, the settable compositions of the present invention further may comprise shale. Among other things, shale included in the settable compositions may react with excess lime to form a suitable cementing material, for example, calcium silicate hydrate. A variety of shales are suitable, including those comprising silicon, aluminum, calcium, and/or magnesium. An example of a suitable shale comprises vitrified shale. Suitable examples of vitrified shale include, but are not limited to, "PRESSUR-SEAL® FINE LCM" material and "PRESSUR-SEAL® COARSE LCM" material, which are commercially available from TXI Energy Services, Inc., Houston, Tex. Generally, the shale may have any particle size distribution as desired for a particular application. In certain embodiments, the shale may have a particle size distribution in the range of from about 37 micrometers to about 4,750 micrometers.

Where present, the shale may be included in the settable compositions of the present invention in an amount sufficient to provide the desired compressive strength, density, and/or cost. In some embodiments, the shale may be present in an amount in the range of from about 1% to about 75% by weight. In some embodiments, the shale may be present in an amount in the range of from about 5% to about 35% by weight. One of ordinary skill in the art, with the benefit of this disclosure, will recognize the appropriate amount of the shale to include for a chosen application.

In certain embodiments, the settable compositions of the present invention further may comprise zeolite. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite.

In certain embodiments, suitable zeolites for use in present invention may include "analcime" (which is hydrated sodium aluminum silicate), "bikitaite" (which is lithium aluminum silicate), "brewsterite" (which is hydrated strontium barium calcium aluminum silicate), "chabazite" (which is hydrated calcium aluminum silicate), "clinoptilolite" (which is hydrated sodium aluminum silicate), "faujasite" (which is hydrated sodium potassium calcium magnesium aluminum silicate), "ferrierite", "harmotome" (which is hydrated barium aluminum silicate), "heulandite" (which is hydrated sodium calcium aluminum silicate), "laumontite" (which is hydrated calcium aluminum silicate), "mesolite" (which is hydrated sodium calcium aluminum silicate), "natrolite" (which is hydrated sodium aluminum silicate), "paulingite" (which is hydrated potassium sodium calcium barium aluminum silicate), "phillipsite" (which is hydrated potassium sodium calcium aluminum silicate), "scolecite" (which is hydrated calcium aluminum silicate), "stellerite" (which is hydrated calcium aluminum silicate), "stilbite" (which is hydrated sodium calcium aluminum silicate), and "thomsonite" (which is hydrated sodium calcium aluminum silicate), and combinations thereof. In certain embodiments, suitable zeolites for use in the present invention include chabazite and clinoptilolite. An example of a suitable source of zeolite is available from the C2C Zeolite Corporation of Calgary, Canada.

In some embodiments, the zeolite may be present in the settable compositions of the present invention in an amount in the range of from about 1% to about 40% by weight. In certain embodiments, the zeolite may be present in an amount in the range of from about 5% to about 25% by weight.

In certain embodiments, the settable compositions of the present invention further may comprise a set retarding additive. As used herein, the term "set retarding additive" refers to an additive that retards the setting of the settable compositions of the present invention. Examples of suitable set retarding additives include, but are not limited to, ammonium, alkali metals, alkaline earth metals, metal salts of sulfoalkylated lignins, hydroxycarboxy acids, copolymers that comprise acrylic acid or maleic anhydride, and combinations thereof. One example of a suitable sulfoalkylate lignin comprises a sulfomethylated lignin. Suitable set retarding additives are disclosed in more detail in U.S. Pat. No. Re. 31,190, the entire disclosure of which is incorporated herein by reference. Suitable set retarding additives are commercially available from Halliburton Energy Services, Inc. under the tradenames "HR® 4," "HR® 5," "HR® 7," "HR® 12," "HR® 15," HR® 25," "SCR™ 100," and "SCR™ 500." Generally, where used, the set retarding additive may be included in the settable compositions of the present invention in an amount sufficient to provide the desired set retardation. In some embodiments, the set retarding additive may be present in an amount in the range of from about 0.1% to about 5% by weight.

Optionally, other additional additives may be added to the settable compositions of the present invention as deemed appropriate by one skilled in the art, with the benefit of this disclosure. Examples of such additives include, but are not limited to, accelerators, weight reducing additives, heavyweight additives, lost circulation materials, filtration control additives, dispersants, and combinations thereof. Suitable examples of these additives include crystalline silica compounds, amorphous silica, salts, fibers, hydratable clays, microspheres, pozzolan lime, latex cement, thixotropic additives, combinations thereof and the like.

The foamed cement compositions of the present invention may be prepared in accordance with any suitable technique. For example, the cementitious component and water may be combined and mixed for a sufficient period of time to form a pumpable cement composition. Liquid additives, if any, may be mixed with the water prior to combination with the cementitious component. Dry solid additives, if any, may be dry blended with the cement prior to combination with the water. In certain embodiments, the cement composition then may be pumped to the well bore, and the foaming and stabilizing surfactant followed by the gas may be injected into the cement composition, e.g., at a foaming mixing "T," as the cement composition is being pumped, in an amount sufficient to form a foamed cement composition. After foaming, the foamed cement composition, may be placed in a desired location within the well bore and allowed to set. Those of ordinary skill in the art, with the benefit of this disclosure, will recognize other suitable techniques for preparing the foamed cement compositions of the present invention.

An example of a method of cementing of the present invention comprises: placing a foamed cement composition in a location to be cemented, wherein the foamed cement composition comprises a cementitious component comprising a hydraulic cement and CKD, water, a foaming and stabilizing surfactant, and an oil-swellable particle; and allowing the foamed cement composition to set. The location to be cemented may be any suitable location, including a location above ground or a portion of a subterranean formation, such as between the walls of a well bore and the exterior surface of a pipe string disposed therein.

Another example of a method of cementing of the present invention comprises: providing a cement composition that comprises a cementitious component comprising a hydraulic cement and CKD, water, a foaming and stabilizing surfactant, and an oil-swellable particle; combining the cement composition with a gas to form a foamed cement composition; placing the foamed cement composition in a portion of a subterranean formation; and allowing the foamed cement composition to set therein.

To facilitate a better understanding of the present invention, the following examples of certain aspects of some embodiments are given. In no way should the following examples be read to limit, or define, the scope of the invention.

EXAMPLE 1

A 14 lb/gal Portland class H cement slurry was prepared. The slurry contained 5% amorphous silica (by weight of cement) and 20% oil-swellable elastomer (by weight of cement). The oil-swellable rubber was a block polymer of styrene-butadiene. The slurry was foamed down to 11 lb/gal using 2% foamer 760 by volume of water. Foam weight reached the desired level by mixing in a pressurized foam blending jar for five seconds. For comparison purposes, a slurry was also prepared without the oil-swellable elastomer. The foamed slurries were cured at 140° F. for 24 hours. Physical and mechanical properties are reported in Table 1. Compressive strength testing was performed in accordance with API Recommended Practices 10B, Twenty-Second Edition, December 1997. The Young's Modulus of Elasticity and the Poisson's Ratio were determined in accordance with ASTM D3148-02.

TABLE I

Premium cement mixed at 14 lbs/gal, with 2% bvow foamer

| Sample | Oil-Swellable Elastomer, % bwoc | 24-hr Strength, PSI | Young's Modulus | Poisson's Ratio |
|---|---|---|---|---|
| No. 1 | — | 801 | 2.75E+05 | 0.1575 |
| No. 2 | 20 | 1060 | 3.53E+05 | 0.184 |

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A foamed cement composition comprising:
a cementitious component,
an oil-swellable particle comprising at least one swellable elastomer selected from the group consisting of acrylate butadiene rubber, polyacrylate rubber, isoprene rubber, chloroprene rubber, butyl rubber, brominated butyl rubber, chlorinated butyl rubber, chlorinated polyethylene, neoprene rubber, styrene butadiene block copolymer, sulphonated polyethylene, ethylene acrylate rubber, epichlorohydrin ethylene oxide copolymer, ethylene-propylene rubber, ethylene vinyl acetate copolymer, fluorosilicone rubber, silicone rubber, and combinations thereof,
a foaming and stabilizing surfactant,
a gas, and
water.

2. The foamed cement composition of claim 1 wherein the cementitious component comprises cement kiln dust.

3. The foamed cement composition of claim 1 wherein the cementitious component comprises hydraulic cement.

4. The foamed cement composition of claim 1 wherein the cementitious component comprises cement kiln dust in an amount of about 1% to about 75% by weight of the cementitious component.

5. The foamed cement composition of claim 1 wherein the oil-swellable particle is present in the foamed cement composition in an amount of about 1% to about 27% by weight of the cementitious component.

6. The foamed cement composition of claim 1 wherein the oil-swellable particle is capable of swelling by at least 10% at downhole conditions.

7. The foamed cement composition of claim 1 wherein the foaming and stabilizing surfactant comprises at least one surfactant selected from the group consisting of: a mixture of an ammonium salt of an alkyl ether sulfate, a cocoamidopropyl betaine surfactant, a cocoamidopropyl dimethylamine oxide surfactant, sodium chloride, and water; a mixture of an ammonium salt of an alkyl ether sulfate surfactant, a cocoamidopropyl hydroxysultaine surfactant, a cocoamidopropyl dimethylamine oxide surfactant, sodium chloride, and water; a hydrolyzed keratin; a mixture of an ethoxylated alcohol ether sulfate surfactant, an alkyl or alkene amidopropyl betaine surfactant, and an alkyl or alkene dimethylamine oxide surfactant; an aqueous solution of an alpha-olefinic sulfonate surfactant and a betaine surfactant; and combinations thereof.

8. The foamed cement composition of claim 1 wherein the foamed cement composition comprises at least one additive selected from the group consisting of fly ash, slag, metakaolin, shale, zeolite, a crystalline silica compound, amorphous silica, salt, fiber, hydratable clay, a microsphere, pozzolan lime, latex cement, a thixotropic additive, and combinations thereof.

9. The foamed cement composition of claim 1 wherein the foamed cement composition comprises at least one additive selected from the group consisting of a set retarding additive, an accelerator, a weight reducing additive, a heavyweight additive, a lost circulation material, a filtration control additive, a dispersant, and combinations thereof.

10. The foamed cement composition of claim 1 wherein the foamed cement composition has a density of about 8 pounds per gallon to about 13 pounds per gallon, and wherein the gas is present in an amount of about 10% to about 80% by volume of the foamed cement composition.

11. A foamed cement composition comprising:
a cementitious component,
an oil-swellable particle comprising a block copolymer of styrene butadiene rubber,
a foaming and stabilizing surfactant, and
a gas.

12. The foamed cement composition of claim 11 wherein the cementitious component comprises cement kiln dust.

13. The foamed cement composition of claim 11 wherein the cementitious component comprises hydraulic cement.

14. The foamed cement composition of claim 11 wherein the cementitious component comprises cement kiln dust in an amount of about 1% to about 75% by weight of the cementitious component.

15. The foamed cement composition of claim 11 wherein the oil-swellable particle is present in the foamed cement composition in an amount of about 1% to about 27% by weight of the cementitious component.

16. The foamed cement composition of claim 11 wherein the oil-swellable particle is capable of swelling by at least 10% at downhole conditions.

17. The foamed cement composition of claim 11 wherein the foaming and stabilizing surfactant comprises at least one surfactant selected from the group consisting of: a mixture of an ammonium salt of an alkyl ether sulfate, a cocoamidopropyl betaine surfactant, a cocoamidopropyl dimethylamine oxide surfactant, sodium chloride, and water; a mixture of an ammonium salt of an alkyl ether sulfate surfactant, a cocoamidopropyl hydroxysultaine surfactant, a cocoamidopropyl dimethylamine oxide surfactant, sodium chloride, and water; a hydrolyzed keratin; a mixture of an ethoxylated alcohol ether sulfate surfactant, an alkyl or alkene amidopropyl betaine surfactant, and an alkyl or alkene dimethylamine oxide surfactant; an aqueous solution of an alpha-olefinic sulfonate surfactant and a betaine surfactant; and combinations thereof.

18. The foamed cement composition of claim 11 wherein the foamed cement composition comprises at least one additive selected from the group consisting of fly ash, slag, metakaolin, shale, zeolite, a crystalline silica compound, amorphous silica, salt, fiber, hydratable clay, a microsphere, pozzolan lime, latex cement, a thixotropic additive, and combinations thereof.

19. The foamed cement composition of claim 11 wherein the foamed cement composition comprises at least one additive selected from the group consisting of a set retarding additive, an accelerator, a weight reducing additive, a heavyweight additive, a lost circulation material, a filtration control additive, a dispersant, and combinations thereof.

20. The foamed cement composition of claim 11 wherein the foamed cement composition has a density of about 8 pounds per gallon to about 13 pounds per gallon, and wherein the gas is present in an amount of about 10% to about 80% by volume of the foamed cement composition.

* * * * *